United States Patent [19]
Hayashi et al.

[11] Patent Number: 5,708,344
[45] Date of Patent: Jan. 13, 1998

[54] RESOLVER FOR DETECTING ROTATION POSITION ON THE BASIS OF RESPONSE CURRENT TO PULSE VOLTAGE

[75] Inventors: Yasukazu Hayashi; Shinji Shibata; Hisashi Kamabuchi, all of Niwa-gun, Japan

[73] Assignee: Okuma Corporation, Aichi, Japan

[21] Appl. No.: 675,824

[22] Filed: Jul. 5, 1996

[30] Foreign Application Priority Data

Jul. 12, 1995 [JP] Japan ................... 7-175719

[51] Int. Cl.$^6$ ............................... H02K 24/00
[52] U.S. Cl. ................... 318/605; 318/659; 318/660; 318/661
[58] Field of Search .................. 318/138, 560, 318/561, 603, 608, 605, 659, 660, 661; 340/347 SY

[56] References Cited

U.S. PATENT DOCUMENTS

| | | | |
|---|---|---|---|
| 4,352,050 | 9/1982 | Sakano | 318/661 |
| 4,527,120 | 7/1985 | Kurosawa | 324/166 |
| 4,594,540 | 6/1986 | Currie et al. | 318/661 |
| 4,604,575 | 8/1986 | Shimizu et al. | 324/208 |
| 4,612,503 | 9/1986 | Shimizu et al. | 324/208 |
| 4,754,220 | 6/1988 | Shimizu et al. | 324/208 |
| 5,250,889 | 10/1993 | Ezuka | 318/661 |
| 5,455,498 | 10/1995 | Kakimoto et al. | 318/605 |

*Primary Examiner*—Paul Ip
*Attorney, Agent, or Firm*—Oliff & Berridge

[57] ABSTRACT

A pulse excitation circuit applies a constant voltage to windings, each of which is wound around a respective one of four magnetic poles of a resolver stator. In each of the respective windings, a voltage is generated corresponding to the rotation of the resolver rotor. From the generated voltage, it is possible to detect two flows of electrical currents which have different phases from each other. Values of the electrical currents after a lapse of time 2*Lav/r from the start of pulse excitation (Lav is an average inductance of the windings, while r is a DC resistance of a winding, including an electrical current detection resistance) are converted into two digital values. A micro computer calculates a rotation angle signal θ on the basis of the two digital values.

4 Claims, 3 Drawing Sheets

5,708,344

RESOLVER FOR DETECTING ROTATION POSITION ON THE BASIS OF RESPONSE CURRENT TO PULSE VOLTAGE

BACKGROUND OF THE INVENTION

1. Field of the Invention

The present invention relates to a rotation position detection apparatus which uses a resolver.

2. Description of the Prior Art

FIG. 1 is a block diagram showing a conventional rotation position detection apparatus which uses a resolver. A resolver stator 1 is made of a magnetic body, such as a silicon steel plate, having four magnetic poles situated at the inner surface thereof. Primary wires are wound around the magnetic poles so as to constitute primary windings 4, 5, 6 and 7, and further secondary wires are wound so as to constitute secondary windings 8, 9, 10 and 11. The primary windings 4, 5, 6 and 7 are serially connected. When the primary windings 4, 5, 6 and 7 are supplied with sinusoidal AC voltage VS from a sinusoidal excitation circuit 12, the corresponding magnetic poles each generate an AC magnetic field such that the AC magnetic fields of adjacent magnetic poles have phases which are different from each other by 180°. The secondary windings 8 and 10, and 9 and 11 are serially connected, respectively. The AC magnetic fields, which have been generated by the primary windings, induce AC voltage in the corresponding secondary windings 8, 9, 10 and 11, in which the phase of the induced AC voltage is different by 180° between the secondary windings 8 and 10, and between the secondary windings 9 and 11, respectively. A resolver rotor 3, which comprises a cylinder made of a magnetic body, such as a silicon steel plate, is fixed to the rotor shaft 2 such that the rotor 3 rotates eccentrically with respect to the center of rotation.

Rotation of the resolver rotor 3 will cause the gap between the four magnetic poles of the resolver stator 1 and the resolver rotor 3 to change, which varies magnetic resistance. As a result of the varied magnetic resistance, the serially connected secondary windings 8, 10 and 9, 11 output voltage Va and Vb which have been obtained by modulating the amplitude of the excitation voltage VS so as to correspond to the sine and cosine of the rotation angle of the rotor 3. AD converters 14 and 15, which are connected serially to the secondary windings 8, 10, and 9, 11, respectively, receive and convert the voltage Va and Vb into digital signals Da and Db synchronized with a peak of the excitation voltage VS, the peak being indicated by a synchronous signal PD from a peak detection circuit 13. Since the digital signals Da and Db indicate the sine and cosine of the rotation angle, a micro computer 16 calculates an arc tangent in synchronism with the receipt of the synchronous signal PD, so as to output a rotation angle signal θ.

In the prior art, respective magnetic poles of the stator need to be wound with both primary and secondary wires, which causes difficulty in arranging the windings. Moreover, since many windings are formed as a result of such an arrangement, the cost is inevitably raised. In addition, since the position detection is conducted only at the peak of the excitation voltage, it is impossible to detect a rotation position at a desired timing because the timing of the detection is governed by the frequency of the excitation circuit.

SUMMARY OF THE INVENTION

The present invention has been conceived to overcome the above problems, and therefore aims to provide a rotation position detection apparatus using a resolver, which can detect a position at a desired timing, and which has a simple winding structure.

According to one aspect of the present invention, there is provided a rotation position detection apparatus, comprising: a stator including a plurality of magnetic poles which are wound with a wire so as to constitute windings, and fixedly positioned on a circumference of the stator having a given interval between each other; a rotor having a shape so as to change a gap between the magnetic poles and the rotor in response to rotation of a rotor shaft; an excitation circuit for exciting the magnetic poles by supplying a constant pulse voltage to the windings for a pulse duration which is sufficiently short compared to a rotation cycle of the rotor shaft; an electrical current detection circuit for detecting electrical currents flowing within respective windings of the plurality of magnetic poles after a lapse of a predetermined time from the start of supplying the constant pulse voltage, with the windings remaining supplied with the voltage; and a rotation position calculation circuit for calculating a rotation position of the rotor on the basis of the respectively detected electrical currents.

According to another aspect of the present invention, provided that the minimum and maximum values of variation of inductance of the windings are defined as Lmin and Lmax, respectively, and a DC resistance thereof is defined as r, the inductance being caused due to a change of the gap between the stator and the rotor in response to the rotation of the rotor, at a predetermined time T, takes any value within a range of $$2*Lmin/r \leq T \leq 2*Lmax/r.$$

According to a further aspect of the present invention, provided that an average value of the inductances of the windings is defined as Lav, the predetermined time T is expressed by $$T = 2*Lav/r.$$

According to a still further aspect of the present invention, wherein the plurality of magnetic poles comprise two pairs of magnetic poles positioned orthogonally to each other, and two magnetic poles constituting a respective one of the pairs are opposed to each other having the rotor shaft between them, the detection apparatus further comprises a differential electrical current detection circuit for detecting a difference between values of the electrical currents flowing within the two magnetic poles constituting a respective one of the pairs.

In the present invention, the gap between the rotor and one magnetic pole is changed during the rotation cycle of the rotor shaft. When the gap is detected at at least two magnetic poles, where the cycle of gap change has a different phase for each pole, it is possible to calculate a rotation position of the rotor shaft. By the way, as the gaps are changed during the rotation cycle, the inductances of the windings around the stator are also varied during the rotation cycle. Thus, the detection of the winding inductance is equivalent to the detection of the gap. Therefore, the rotation position of the rotor shaft can be calculated on the basis of the detected winding inductances in place of the detected gaps.

According to one aspect of the present invention, in order to detect an inductance of a winding, a pulse voltage is first applied to the winding, and electrical current flowing therein is then detected after a lapse of a predetermined time from the start of supplying the voltage. An applied voltage in a winding will induce a flow of electrical current therein, in which the value of the induced current increases with a delay due to the inductance of the winding. A large inductance causes a relatively slow increase of the value, while a small inductance causes a relatively fast increase. Thus, the value of the electrical current within the winding after a lapse of a predetermined time from the start of supplying voltage differs depending on the inductance of the winding. Therefore, by detecting the value of the electrical current, it is possible to detect the inductance of the winding, which further makes it possible to calculate a rotation position of the rotor shaft on the basis of the detected inductance, as described above.

According to another aspect of the invention, when the predetermined time T is defined as $$2*Lmin/r \leq T \leq 2*Lmax/r,$$

it is possible to utilize a range where the electrical current varies significantly with variation of the winding inductance, that is, a range showing a large (dI/dL). As a result, it is possible to perform position detection with a favorable signal to noise ratio (S/N).

According to a further aspect of the invention, when the predetermined time T is defined as $$T=2*Lav/r,$$

the time T is in the middle of the above mentioned time range. As a result, a stable S/N ratio can be achieved over the entire range for gap detection.

According to a still further aspect of the invention, when variation of a winding inductance is detected on the basis of the currents which have been detected at two magnetic poles which are opposed to each other having the rotor shaft between them, it is possible to obtain a detection signal having a higher S/N ratio.

BRIEF DESCRIPTION OF THE DRAWINGS

The above and other objects, features and advantages will be apparent from the following description of the preferred embodiment taken in conjunction with the accompanying drawings wherein.

DESCRIPTION OF THE PREFERRED EMBODIMENT

In the following, a preferred embodiment of the present invention will be described with reference to the accompanying drawings.

Figure 1:
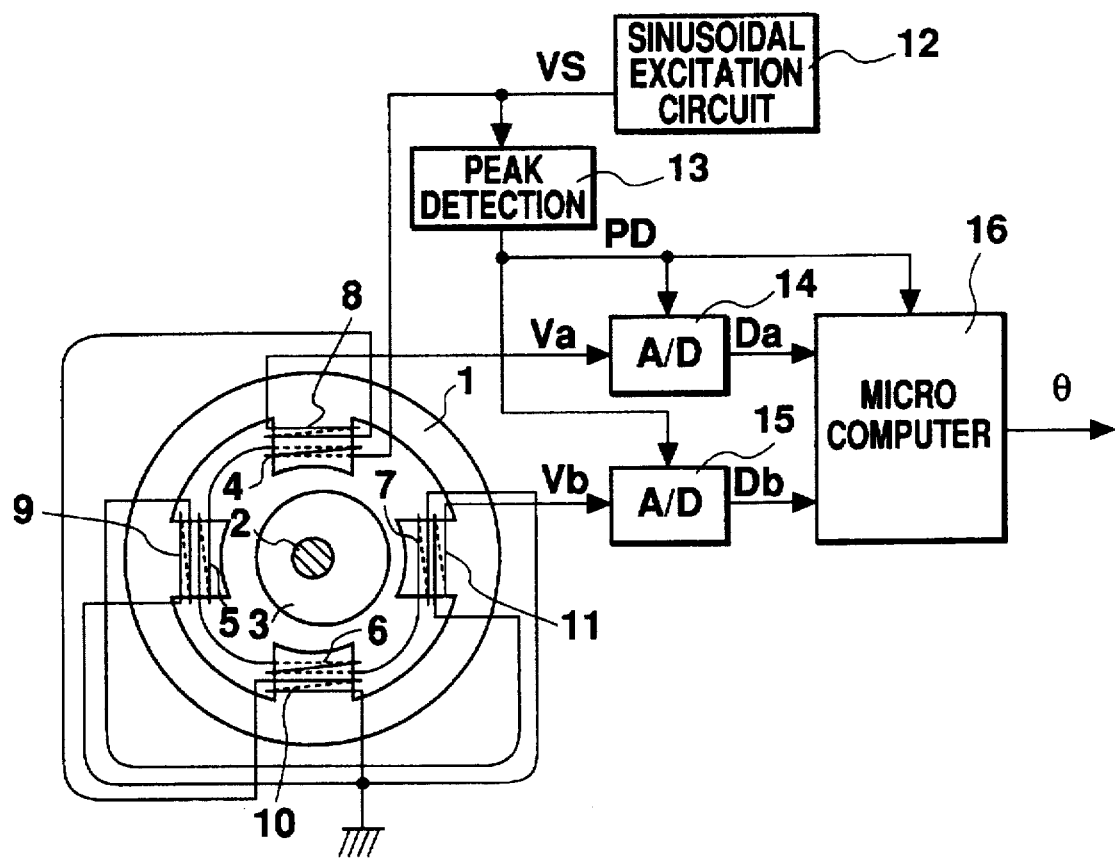
FIG. 1 is a block diagram showing a conventional rotation position detection apparatus.
Figure 2:
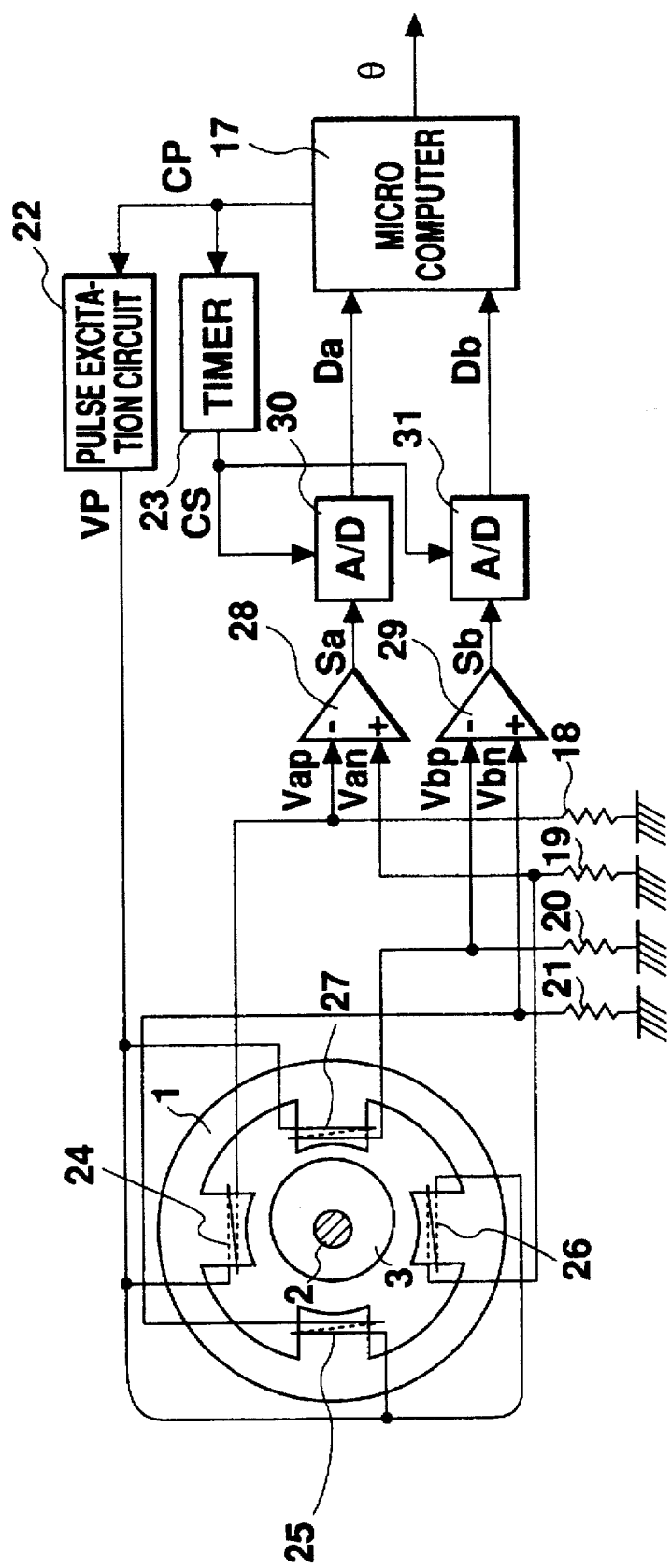
FIG. 2 is a block diagram showing a preferred embodiment of a rotation position detection apparatus according to the present invention.
Figure 3:
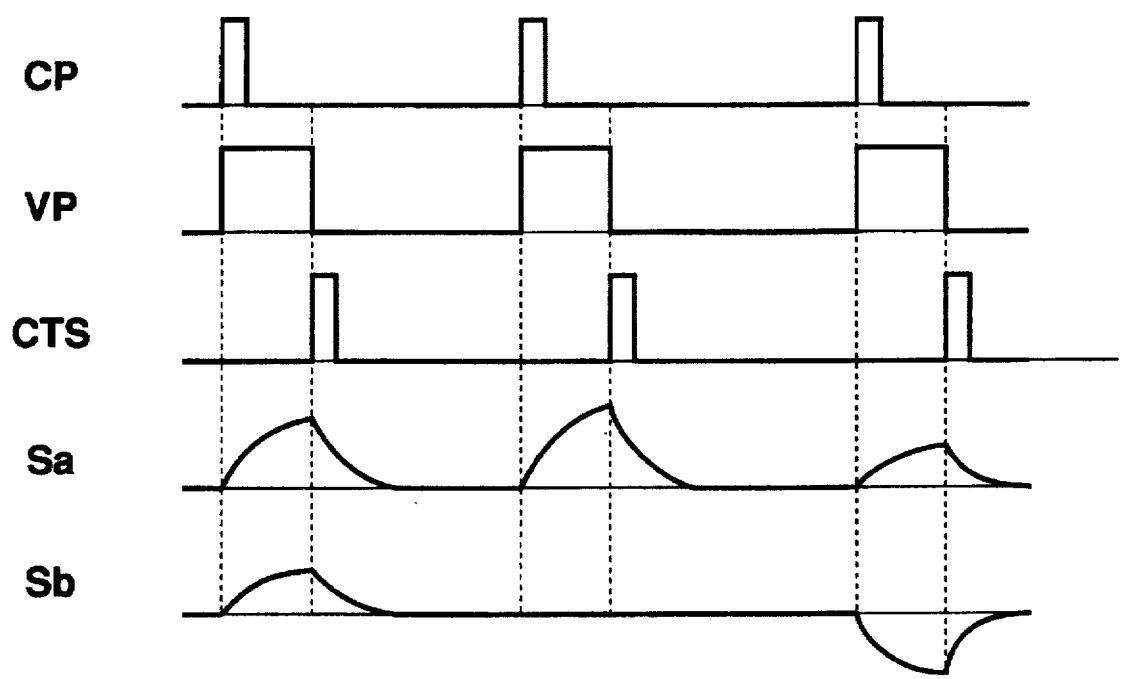
FIG. 3 is a timing chart showing an operation of the preferred embodiment.

FIG. 2 is a block diagram showing a preferred embodiment of a rotation position detection apparatus according to the present invention, wherein the same elements as those in FIG. 1 are given the same reference numerals, and explanation thereof is omitted. FIG. 3 is a timing chart for explaining about the operation of the rotation position detection apparatus in FIG. 2.

Referring to FIG. 2, the micro computer 17 outputs a pulse excitation command signal CP to a pulse excitation circuit 22 at a desired timing for position detection. Here, the resolver stator 1 has four magnetic poles attached thereon having a 90° interval between adjacent ones, and a wire is wound around the respective four magnetic poles so as to constitute windings 24, 25, 26 and 27. Upon receipt of the signal CP, the pulse excitation circuit 22 applies a constant voltage V to one end of the respective windings 24, 25, 26 and 27 for a period of time T, so as to excite the magnetic poles.

When the resolver rotor 3 rotates, as in the prior art, the gaps between the four magnetic poles and the resolver rotor 3 are changed, thereby varying magnetic resistance. As a result of the varied magnetic resistance, inductances Lap, Lan, Lbp, and Lbn of the windings 24, 26, 27 and 25 are varied with respect to the rotor rotation angle θ, as shown in the following:

$$Lap=Lav+K*SIN(\theta)$$

$$Lan=Lav-K*SIN(\theta)$$

$$Lbp=Lav+K*COS(\theta)$$

$$Lbn=Lav-K*COS(\theta)$$

wherein Lav is the average inductance of the windings, K is a constant, and θ is a rotation angle of the resolver rotor 3.

With the DC resistance of a winding, including the corresponding electrical current detection resistor, being r, the duration T is defined as $$T=2*lav/r.$$

The other ends of the respective windings 24, 26, 27 and 25 are grounded via electrical current detection resistors 18, 19, 20 and 21, all of which have the same value of resistance R, whereby the currents flowing within the respective windings are converted into voltage Vap, Van, Vbp, and Vbn. There is a 180° phase difference between the phases of the voltage signals Vap and Van, and between the phases of the voltage signals Vbp and Vbn because inductances of the magnetic poles corresponding to respective voltage signals vary having a 180° phase difference from each other. Thus, when the voltage signals Vap and Van are supplied to a differential amplifier 28 so as to detect the difference between them, it is possible to obtain a signal which represents variation of the inductance in the direction of connecting the magnetic poles 24 and 26. This signal is a differential electrical current Sa. The voltage signals Vbp and Vbn are similarly supplied to a differential amplifier 29, so that differential electrical current Sb, that is, a signal which represents variation of the inductance in the direction of connecting magnetic poles 25 and 27, is obtained. The differential currents Sa and Sb are now supplied to A/D converters 30 and 31. When the A/D converters 30 and 31 receive an AD conversion start command signal Cs which is output from a timer 23 after a lapse of time T from the start of pulse excitation, they convert the supplied differential currents Sa and Sb into digital signals Da and Db, respectively.

The value of a winding current is obtainable from $$V/r*(1-e^{-rT/L}).$$

In this event, wherein Lav>>K, the electrical currents which flow within the respective windings after a lapse of time T from the start of pulse excitation, i.e., the electrical currents Iap, Ian, Ibp, and Ibn, are expressed as $$Iap=V/r*(1-e^{-2*Lav/Lap})-V/r*(1-e^{-2}-2*e^{-2}*K*SIN(\theta)/Lav)$$

$$Ian=V/r*(1-e^{-2*Lav/Lan})-V/r*(1-e^{-2}+2*e^{-2}*K*SIN(\theta)/Lav)$$

$$Ibp=V/r*(1-e^{-2*Lav/Lbp})-V/r*(1-e^{-2}-2*e^{-2}*K*COS(\theta)/Lav)$$

$$Ibp=V/r*(1-e^{-2*Lav/Lbn})-V/r*(1-e^{-2}+2*e^{-2}*K*COS(\theta)/Lav).$$

Based on the above, the following expressions are introduced.

$$Va=-Vap+Van=R*(-Iap+Ian)-4*R*V/r*Lav*e^{-2}*K*SIN(\theta)$$

$$Vb=-Vbp+Vbn=R*(-Ibp+Ibn)-4*R*V/r*Lav*e^{-2}*K*COS(\theta)$$

As is obvious from the above expressions, the values of the digital signals Da and Db are proportional to the sine and cosine of the rotor rotation angle θ. The micro computer 17 calculates an arc tangent based on the values of the digital signals Da and Db, so as to output a rotation angular signal θ.

In the foregoing embodiment, four magnetic poles are formed on the stator, each having a 90° interval from adjacent ones, and the windings around the respective poles are connected so that inductances thereof are independently detected. However, the number and position of the magnetic poles and manner of connecting the windings are not limited to what is employed in the above embodiment. As long as at least two inductances can be detected, which vary due to the rotation of the rotor, having a phase difference, the number and position of the magnetic poles and the manner of connecting the windings may be arranged differently. Further, in the above embodiment, a voltage difference is calculated between windings of the magnetic poles which are opposed to each other having the rotor shaft between them. However, provided that a single magnetic pole alone can produce an output which shows a sufficient linearity, the poles subjected to the calculation need not constitute a pair. In this arrangement, provision of two magnetic poles alone will be sufficient for the same calculation.

In the foregoing embodiment, a time T to be set on the timer 23 is defined as 2*Lav/r for the following reason.

Provided that a time after the start of pulse excitation and an inductance of a winding are defined as t and L, respectively, the electrical current which flows within the winding is expressed as $$I=V/r*(1-e^{-r*t/L}).$$

Therefore, the value of the electrical current I immediately after the start (t=0) is zero (I=0), and it becomes close to V/r, irrespective of the winding inductance, as the time T becomes longer. This fact means that an effective signal is not always obtained when the excitation voltage is large.

A time t when the variation of L can be most efficiently detected from a winding current is when the electrical current I varies most significantly with respect to the variation of L. By differentiating I with respect to L, the next expression is obtained.

$$dI/dL=-(V*t/L^2)*e^{-r*t/L}$$

In general, when dI/dL takes the maximum value, differentiation applied to the right side of this expression with respect to L will result in zero, based on which the following expression results.

$$V*t/L^3*(2-r*t/L)*e^{-r*t/L}=0$$

According to this expression, when t=2*L/r is held, the variation of L can be most efficiently detected from the winding current I.

Therefore, provided that the minimum and maximum values of a winding inductance, which varies according to the rotation of the rotor, are defined as Lmin and Lmax, respectively, the variation of an inductance can be efficiently detected from the variation of a corresponding winding current when the time T to be set on a timer takes any value which can hold the expression of 2*Lmin/r≦T≦2*Lmax/r. Particularly, in the case of T=2*Lav/r, since the time T is in the middle of the above defined range, balanced detection of a winding inductance can be achieved.

As described in the above, according to the preferred embodiment, it is possible to excite a resolver at a desired timing for position detection with a pulse voltage for a pulse duration which is sufficiently short compared to the rotation cycle of the rotor shaft. As a result, a rotation position can be detected by a resolver at a desired timing. Further, since position detection can be executed not only with a simple winding structure, but also on the basis of a signal having a high S/N ratio, it is possible to realize a highly reliable rotation position detection apparatus for a low cost.

What is claimed is:

1. A rotation position detection apparatus, comprising:

a stator including a plurality of magnetic poles which are wound with a wire so as to constitute windings, and fixedly positioned on a circumference of the stator having a given interval between each other;

a rotor having a shape so as to change a gap between the magnetic poles and the rotor in response to rotation of a rotor shaft;

an excitation circuit for exciting the magnetic poles by supplying a constant pulse voltage to the windings for a pulse duration which is sufficiently short compared to a rotation cycle of the rotor shaft;

an electrical current detection circuit for detecting electrical currents flowing within respective windings of the plurality of magnetic poles after a lapse of a predetermined time from a start of supplying the constant pulse voltage to the windings, with the windings remaining supplied with the voltage; and a rotation position calculation circuit for calculating a rotation position of the rotor on the basis of the electrical currents respectively detected.

2. A rotation position detection apparatus according to claim 1, in which minimum and maximum values of variation of inductance of the windings are defined as Lmin and Lmax, respectively, and a DC resistance thereof is defined as r, the inductance being caused due to a change of the gap between the magnetic poles and the rotor in response to the rotation of the rotor, wherein the predetermined time T takes any value within a range of $$2*Lmin/r \leq T \leq 2*Lmax/r.$$

3. A rotation position detection apparatus according to claim 2, in which an average value of the inductances of the windings is defined as Lav, wherein the predetermined time T is expressed by $T=2*Lav/r.$ 4. The rotation position detection apparatus according to claim 1, wherein the plurality of magnetic poles comprise two pairs of magnetic poles positioned orthogonally to each other, and two magnetic poles constituting a respective one of the pairs are opposed to each other having the rotor shaft between them, the detection apparatus further comprising, a differential electrical current detection circuit for detecting a difference between values of the electrical currents flowing within the two magnetic poles constituting a respective one of the pairs.

* * * * *